(12) United States Patent
Dutta et al.

(10) Patent No.: US 6,791,548 B2
(45) Date of Patent: Sep. 14, 2004

(54) METHOD AND APPARATUS FOR AUTOMATICALLY DISPLAYING DYNAMIC IMAGES AS A SEQUENCE OF STILL FRAMES ARRANGED IN A PREDETERMINED ORDER

(75) Inventors: Rabindranath Dutta, Austin, TX (US); Mark Joseph Hamzy, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 09/736,347

(22) Filed: Dec. 14, 2000

(65) Prior Publication Data

US 2002/0075269 A1 Jun. 20, 2002

(51) Int. Cl.$^7$ ............................................... G06T 15/70
(52) U.S. Cl. ....................................................... 345/473
(58) Field of Search ................................ 345/473, 781, 345/719, 721, 723; 348/719, 721, 723

(56) References Cited

U.S. PATENT DOCUMENTS

| | | | |
|---|---|---|---|
| 5,694,560 A | * 12/1997 | Uya et al. ................... 345/781 |
| 5,774,664 A | 6/1998 | Hidary et al. .......... 395/200.48 |
| 5,884,056 A | 3/1999 | Steele ......................... 395/339 |
| 5,977,965 A | * 11/1999 | Davis, III et al. .......... 345/723 |
| 6,009,410 A | 12/1999 | LeMole et al. ................ 705/14 |
| 6,262,724 B1 | * 7/2001 | Crow et al. .................. 345/723 |
| 6,304,297 B1 | * 10/2001 | Swan .......................... 348/556 |
| 6,426,778 B1 | * 7/2002 | Valdez, Jr. .................. 348/563 |
| 6,469,711 B2 | * 10/2002 | Foreman et al. ............. 345/723 |

* cited by examiner

*Primary Examiner*—Don Wong
*Assistant Examiner*—Huedung X. Cao
(74) *Attorney, Agent, or Firm*—David A. Mims, Jr.; Rudolf O. Siegesmund

(57) ABSTRACT

A method for automatically displaying dynamic images as a sequence of still frames is disclosed. The method includes receiving dynamic image data, transforming the dynamic image data into static image data, and displaying, frame by frame, the static image data on a display device. The method may be employed in a computer, a computer network or a system which has a display information card having at least a port for receiving the dynamic image data, a processor for transforming the dynamic image data into static image data, an internal memory for storing the static image data, and a display device. In the preferred embodiment, the method is employed in a web browser.

24 Claims, 4 Drawing Sheets

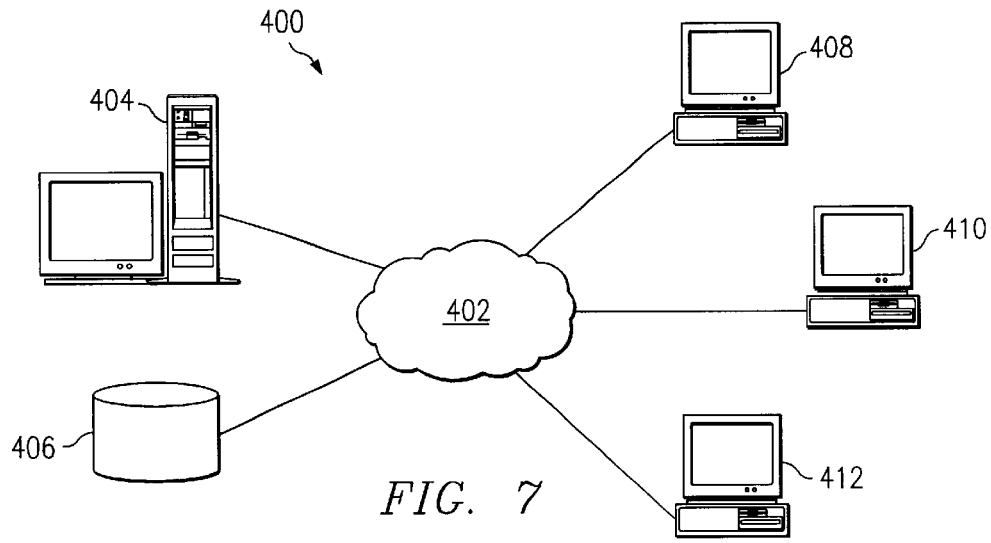
FIG. 7
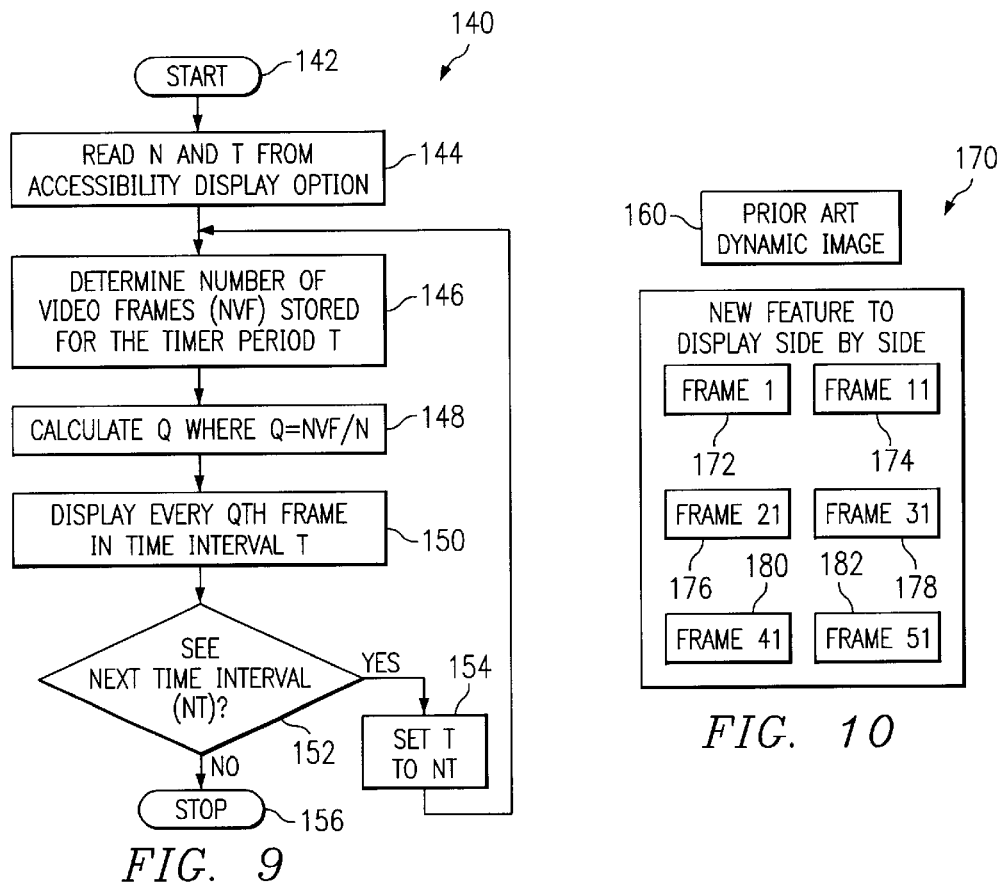
FIG. 9
FIG. 10

METHOD AND APPARATUS FOR AUTOMATICALLY DISPLAYING DYNAMIC IMAGES AS A SEQUENCE OF STILL FRAMES ARRANGED IN A PREDETERMINED ORDER

TECHNICAL FIELD

This invention relates to images displayed by a computer, and more particularly, to a method and system for automatically displaying dynamic images on a display device as a sequence of still frames arranged in a predetermined order.

BACKGROUND OF THE INVENTION

Video displays on a display device of a computer connected to the Internet often cause accessibility problems for viewers. Incoming dynamic video displays have a predetermined frame speed. When a video frame with a predetermined speed is displayed on a displaying system, and the predetermined speed is independent of the displaying system, a viewer may not be able to read text after a certain point in frame speed is reached in the display of the video frames. Problems also occur when animated file formats are used. One type of animated file format is the Graphics Interchange Format (GIF) developed by CompuServ and used for transmitting faster images on the Internet. Another animated file format is Flash which is a vector graphics file developed by Macromedia to enable designers to add animation and interactivity to multimedia Web pages. In fact, any system that displays time varying imagery will have similar accessibility problems.

One method of dealing with the problem of text displayed in time varying imagery is to freeze a frame by disabling the animation software. However, displaying frozen frames one by one is not the most accessible solution because very quick reflexes are required to freeze a frame. Another method is to slow the speed of the video presentation; however, a slow speed video presentation is not always adequate for accessibility purposes. For example, a slow speed video presentation is not adequate when a printout of a dynamic image is desired.

U.S. Pat. No. 5,884,056, entitled "Method and System for Video Browsing on the World Wide Web," describes a system and method for supporting video browsing over a communication network. U.S. Pat. No. 5,774,664, entitled "Enhanced Video Programming Method for Incorporating and Displaying Retrieved Integrated Internet Information Segments," describes a system for integrating video programming with the information resources of the Internet. U.S. Pat. No. 6,009,410, entitled "Method and System for Presenting Customized Advertizing to a User on the World Wide Web," describes a customized advertising repository server connected on the World Wide Web (WWW) which can be accessed by a registered user through his or her browser either by clicking on an icon, or by inputting the specific URL address of the particular server which stored that user's advertising repository.

Accordingly, a need exists for a way to provide user control of time varying imagery. A further need exists for a way to display static images from a dynamic display by displaying the static images according to a predetermined order or relationship, such as side by side on a screen.

SUMMARY OF THE INVENTION

A method for automatically displaying dynamic images as a sequence of still frames is disclosed. The method includes receiving dynamic image data, transforming the dynamic image data into static image data, and displaying, frame by frame, the static image data on a display device. The method may be employed in a computer, a computer network or a system which has a display information card having at least a port for receiving the dynamic image data, a processor for transforming the dynamic image data into static image data, an internal memory for storing the static image data, and a display device. In the preferred embodiment, the method is employed in a web browser.

BRIEF DESCRIPTION OF THE DRAWINGS

The present invention will now be described, by way of example, with reference to the accompanying drawings, in which:

FIG. 7 is a depiction of a network;

FIG. 9 is a flow chart of an alternate static display process; and

FIG. 10 is a depiction of a static display configuration.

DESCRIPTION OF THE PREFERRED EMBODIMENT

Figure 1:
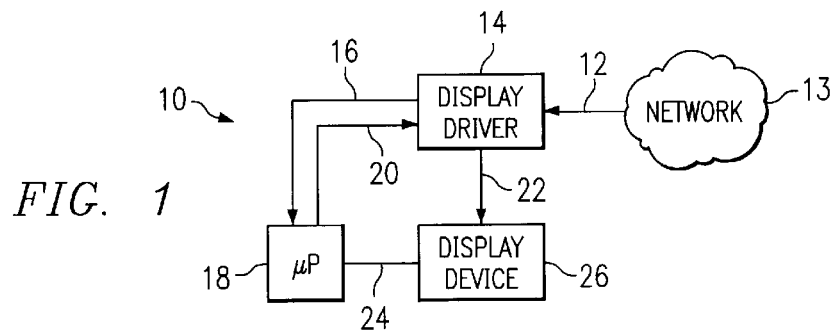
FIG. 1 is a schematic depicting a static display device.

Referring to FIG. 1, static display device 10 has micro-controller 18, display device 26, and display driver 14 connected to Network 13. Dynamic imagery 12 originates from network 13 and enters display driver 14. As used herein, the term "dynamic imagery" means a plurality of static frames in a tile format where the frames are displayed on the basis of a time index when the appropriate code for the file format is invoked. As used herein, the term "file format" means the structure of a file that defines the way the data in the file is stored and laid out on the screen or in print. As used herein, the term "static frame" means a single screen-sized image that can be displayed in sequence with other, slightly different, images to create animated drawings or motion pictures. As used herein, the term "time index" means the number of frames per second that will be displayed (a small animated file may contain ten frames while a motion picture will contain thousands of frames). In order to select a static frame based on the time index, a time interval is selected. For example, given a motion picture of 90 minutes duration, if the time interval selected is five minutes, and the standard time index of 30 frames per second is used, then every $900^{th}$ frame would be displayed. Indicator 16 signals the arrival of dynamic imagery 12 originating from display driver 14 and acting upon micro-controller 18. Upon a determination by micro-controller 18 regarding what type of dynamic imagery is contained in dynamic imagery 12, command 20 is sent from micro-controller 18 to display driver 14 for transforming dynamic imagery 12 into static imagery 22. As used herein, the term "transforming" means that a determination is made as to the file format and the time index of the dynamic imagery, and that responsive to the file format and the time index, the appropriate code for the particular file format is invoked to store static frames selected on the basis of the time index so that they may be displayed as static frames on demand. Also included in the term transforming, is a determination as to whether there are any compressed files. If there are compressed files, then the compressed files are uncompressed. As used herein, the term compressed means a file whose contents have been compressed by a special utility program so that it occupies less space on a storage device than in its uncompressed (normal) state. Static imagery 22 is displayed on display device 26 upon demand by a user (not shown). Display device 26 can be a cathode ray tube (CRT), a liquid crystal display (LCD), a light emitting diode (LED), or a plasma display device. Furthermore, micro-controller 18, upon a determination that a particular type of static imagery is being derived from dynamic imagery 12, may be coupled to display device 26. Micro-controller 18 may issue command 24 to display device 26 whereby display device 26 is prepared for receiving static imagery 22. However, if display device 26 is a non-intelligent display device because it cannot process command 24, micro-processor 18 may not be coupled to display device 26.

Figures 2, 3:
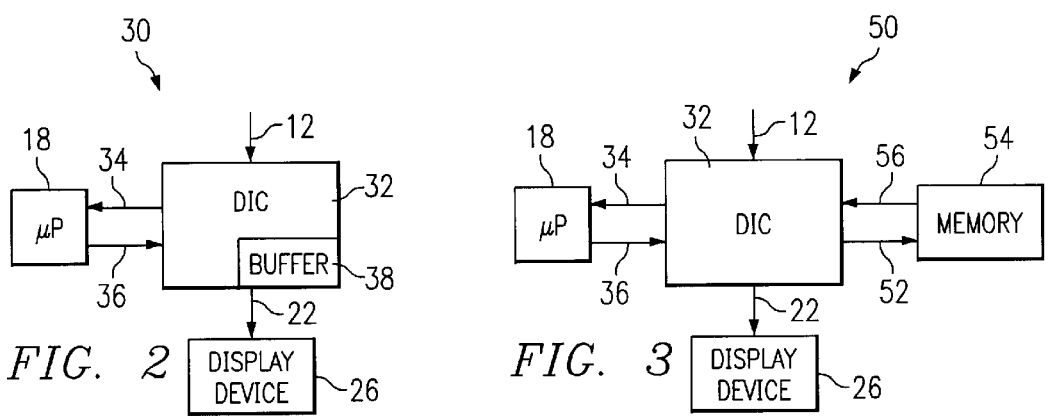
FIG. 2 is a schematic depicting an alternate static display device.
FIG. 3 is a schematic depicting a second alternate static display device.

Referring to FIG. 2, first alternate static display device 30 has incoming dynamic imagery 12 flowing into display information card 32 which is coupled to micro-controller 18 by line 34. Note that indicator 16 transmits via line 34. Upon a determination by micro-controller is of the type of dynamic imagery contained in incoming dynamic imagery 12, command 20 is sent via coupling 36 from micro-controller 18 to display information card 32 for transforming dynamic imagery 12 into static imagery 22. Static imagery 22 may be temporarily stored in buffer 38 incorporated within display information card 32. Note that instead of temporarily storing static imagery 22 in buffer 38, static imagery 22 can go directly to display device 26. Upon demand by a user (not shown), static imagery 22 is displayed on display device 26.

Referring to FIG. 3, second alternative static display device 50 has incoming dynamic imagery 12 flowing into display information card 32, which is coupled to micro-controller is by line 34. Note that indicator 16 may transmit via line 34. Upon a determination by micro-controller 18 of the type of dynamic imagery contained in dynamic imagery 12, command 20 may be sent, via coupling 36, from micro-controller 18 to display information card 32 for transforming incoming dynamic imagery 12 into static imagery 22. Static imagery 22 may be transmitted via coupling 52 to memory 54 for temporary storage, and back to display information card 32 via coupling 56. Memory 54 is not incorporated within display information card 32. Alternatively, static imagery 22 may go directly to display device 26. After storage in memory 54, static imagery 22 is displayed on display device 26 upon demand by a user (not shown). Dynamic imagery 12 may flow directly into micro-controller 18 via line 34, and upon processing therein, dynamic imagery 12 may flow directly into memory 54, or to display device 26 (not shown in FIG. 3).

Figure 4:
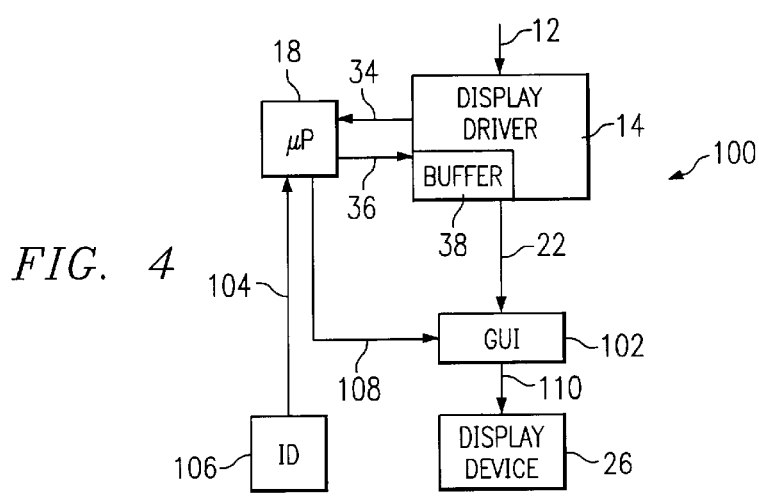
FIG. 4 is a schematic depicting a third alternate static display device.

Referring to FIG. 4, third alternate static display device 100 is described. Dynamic imagery 12 flows into display driver 14, which is coupled to micro-controller 18 via line 34. Indicator (not shown) signals the arrival of dynamic imagery 12 originating from display driver 14 and acting upon micro-controller 18. Upon a determination by micro-controller 18 regarding the type of dynamic imagery contained in incoming dynamic imagery 12, command 20 is sent, via coupling 36 from micro-controller 18 to display driver 14 for transforming dynamic imagery 12 into static imagery 22. Static imagery 22 may be temporarily stored in buffer 38 that is incorporated within display driver 14. Alternatively, static imagery 22 can go directly to display device 26. As used herein, the term Graphical User Interface (GUI) means an application having standard software routines to create a visual computer environment that represents programs, files, and options with graphical images, such as icons, menus, and dialog boxes on the screen. GUI 102 is coupled to the buffer 38 and may display an indication of each static image data in of buffer 38. As used herein, the term indication means a graphical representation such as an icon or a number. Static imagery 22 is displayed on display device 26 upon demand by a user (not shown) who executes input command 104 via input device 106 such as a mouse. Note that the micro-controller is coupled to GUI 102 via line 108. GUI 102 is coupled to display device 26 via line 110.

Figure 5:
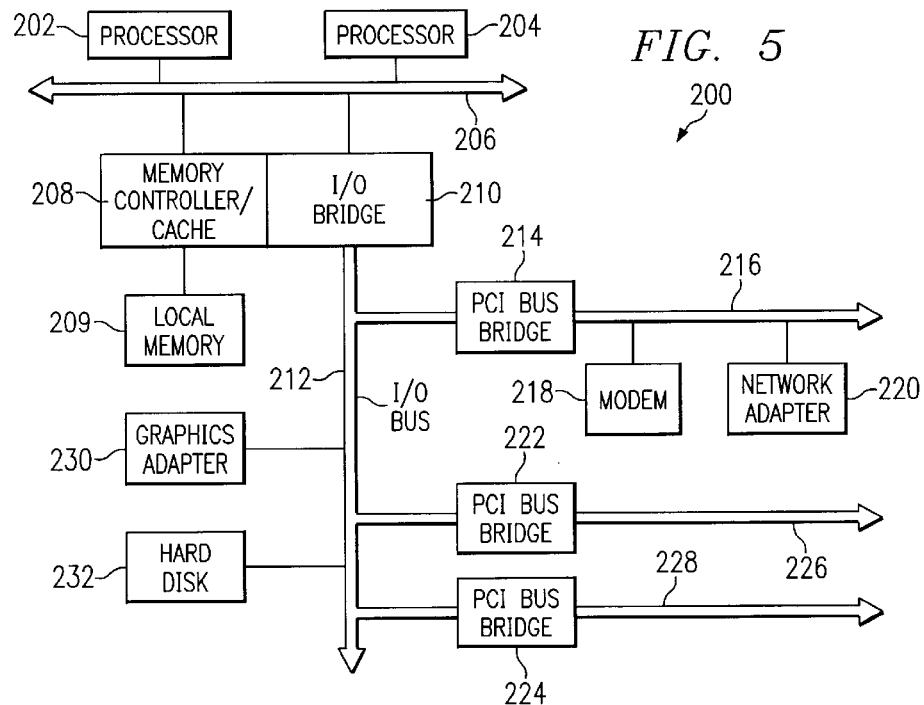
FIG. 5 is a depiction of a server computer.
Figure 6:
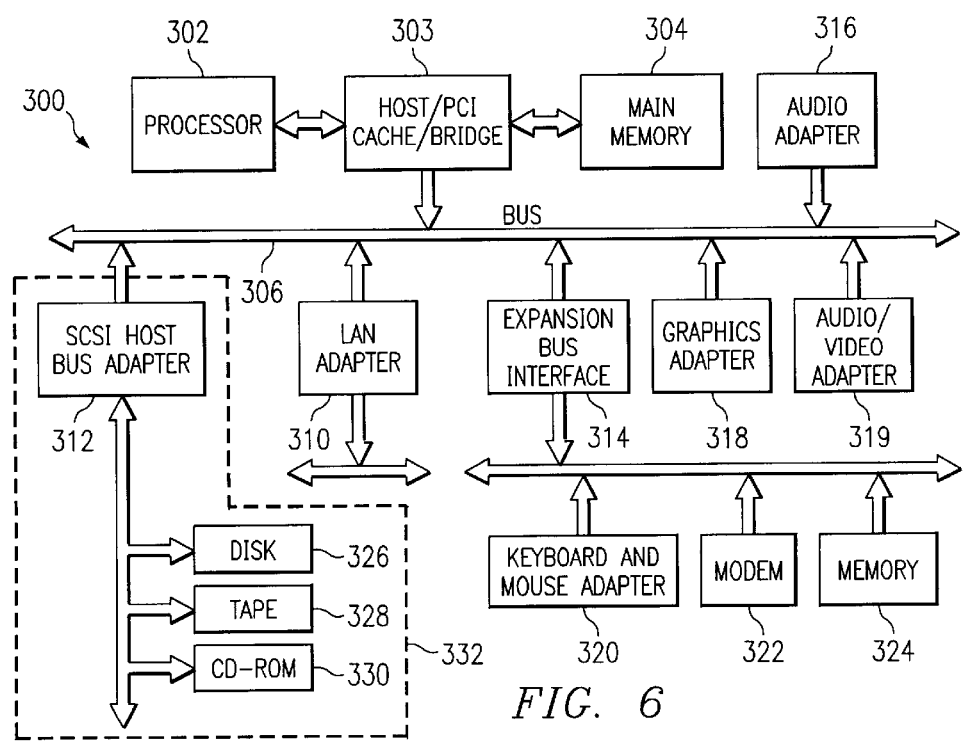
FIG. 6 is a depiction of a computer.

In the preferred embodiment, the static display process for transforming dynamic imagery into static imagery resides in a web browser. As used herein, the term web browser means software that lets a user view HTML documents and access files and software related to those documents. The static display process described herein may be embedded in a web browser or it may be used with an existing web browser as a plug in. As used herein, the term plug-in means a software program that plugs into a larger application to provide functionality. Alternatively, the static display process described herein may be accessed by a web browser by a hyperlink provided by the web browser or by reference to a separate web page Uniform Resource Locator (URL) provided by the web browser. As used herein, the term hyperlink means a connection between an element in a hypertext document and a different element in the another document. As used herein the term Uniform Resource Locator (URL) means an address for a resource on the Internet. FIGS. 5 through 7 depict representative computers and a network in which the present invention may be implemented which are in addition to the devices disclosed in FIGS. 1 through 4.

Referring to FIG. 5, a block diagram depicts a data processing system, which may be implemented as a server, such as server 404 in FIG. 7 in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted Peripheral component interconnect (PCI) bus bridge 214 connected to I/O bus 212 provides an interface to PCI local bus 216. Modem 218 may be connected to PCI bus 216. Typical PCI bus implementations will support four PCI expansion slots or add-in connectors. Communications links to network computers 408, 410, and 412 in FIG. 7 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 5 may vary. For example, other peripheral devices, such as optical disk drive and the like also may be used in addition or in place of the hardware depicted. The depicted example is not meant to imply architectural limitations with respect to the present invention. The data processing system depicted in FIG. 5 may be, for example, an IBM RISC/System 6000 system, a product of International Business Machines Corporation in Armonk, N.Y., running the Advanced Interactive Executive (AIX) operating system.

With reference now to FIG. 6, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 7. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Inc. Instructions for the operating system, the object-oriented operating system, and applications or programs may be located on storage devices, such as hard disk drive 326, and they may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 7. Also, the processes of the present invention may be applied to a multiprocessor data processing system. For example, data processing system 300, if optionally configured as a network computer, may not include SCSI host bus adapter 312, hard disk drive 326, tape drive 328, and CD-ROM 330, as noted by the box with the dotted line in FIG. 6 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 7 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

FIG. 7 depicts a pictorial representation of a distributed data processing system in which the present invention may be implemented and is intended as an example, and not as an architectural limitation, for the processes of the present invention. Distributed data processing system 400 is a network of computers which contains a network 402, which is the medium used to provide communications links between various devices and computers connected together within distributed data processing system 400. Network 402 may include permanent connections, such as wire or fiber optic cables, or temporary connections made through telephone connections. In the depicted example, a server 404 is connected to network 402 along with storage unit 406. In addition, clients 408, 410, and 412 also are connected to a network 402. Clients 408, 410, and 412 may be, for example, personal computers or network computers.

For purposes of this application, a network computer is any computer, coupled to a network, which receives a program or other application from another computer coupled to the network. In the depicted example, server 404 may provide applications such as static display processes described in FIGS. 8, 8A, 8B and 9 to clients 408, 410 and 412. Clients 408, 410, and 412 are clients to server 404. Distributed data processing system 400 may include additional servers, clients, and other devices not shown. In the depicted example, distributed data processing system 400 is the Internet with network 402 representing a worldwide collection of networks and gateways that use the TCP/IP suite of protocols to communicate with one another. Distributed data processing system 400 may also be implemented as a number of different types of networks, such as for example, an intranet, a local area network (LAN), or a wide area network (WAN).

Figure 8:
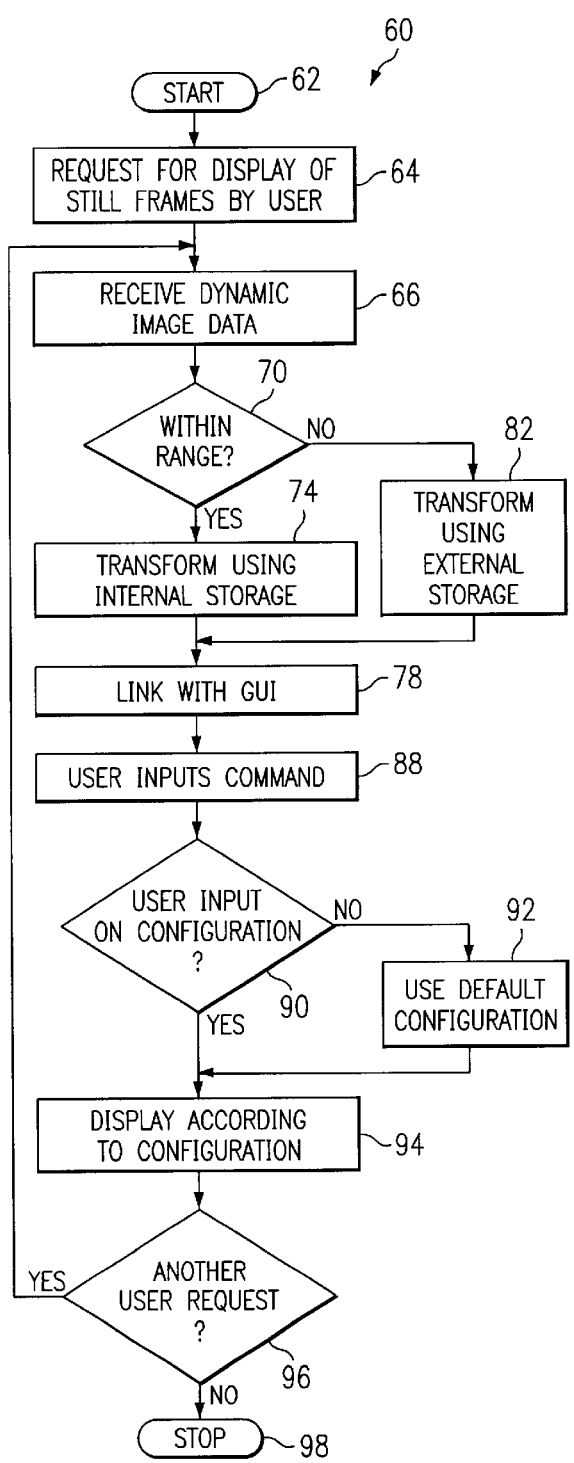
FIG. 8 is a flow chart of the static display process.

Referring to FIG. 8, static display process 60 for transforming dynamic imagery 12 into static imagery 22 is shown. Static display process 60 begins (62) and a request for display of still frames is made by the user (64). The dynamic image data is received for processing (66). A determination is made whether the quantity of dynamic image data exceeds a predetermined range (70). If the quantity of dynamic image data falls within the range, the dynamic imagery data is transformed using internal storage (74). An internal storage device with limited capacity, such as a buffer is provided for storing the image data. An indication of the static image data may be linked with a graphic user interface (GUI) such that a user (not shown) may access a multiplicity of similar static image data at once via the GUI (78). If the display device cannot accommodate all of the static image data at once, an indication may be displayed by the GUI. If a determination is made that the quantity of dynamic image data exceeds the predetermined range, the dynamic image data is transformed into static image data using an external storage device (82). An indication of the static image data may be linked with a graphic user interface (GUI) such that a user (not shown) may access of a multiplicity of similar static image data at once via the GUI (78).

In either step 82 or step 74 the transformation is accomplished in the same manner using two subroutines discussed below in FIGS. 8A and 8B. FIG. 8B depicts the accessibility option process in which the user enters default values necessary for the transformation accomplished in steps 82 and 84. In addition, the static display control process, depicted in FIG. 8B is necessary to complete the transformation. Therefore, accessibility option process 120 and static display control process 100 are included by reference in steps 82 and 74 of static display process 60 depicted in FIG. 8.

The user of the static image process inputs a command to call up the static image data (88). The command to call up the static image can be accomplished by pointing a mouse at an icon that represents the indication of the static image data, and clicking on the icon to read from the memory with the image stored therein. A determination is made as to whether the user has supplied input on how the static images are to be displayed (90). If the user has not applied such information, then the process will use the default configuration (92). If the user has supplied such information, then the process will display the static image data according to the configuration input provided by the user (94). The retrieved image data causes at least a subsection of the display device to display the static image. For example, a subsection of a plasma display screen may display the static image as long as is required by the user. FIG. 10 depicts an example of one configuration for display of the static image data. Static display process then makes a determination whether there is another user request (96). If there is another user request, static display process 60 returns to step 66. If there is not another user request, static display process 60 ends (98).

Figure 8A:
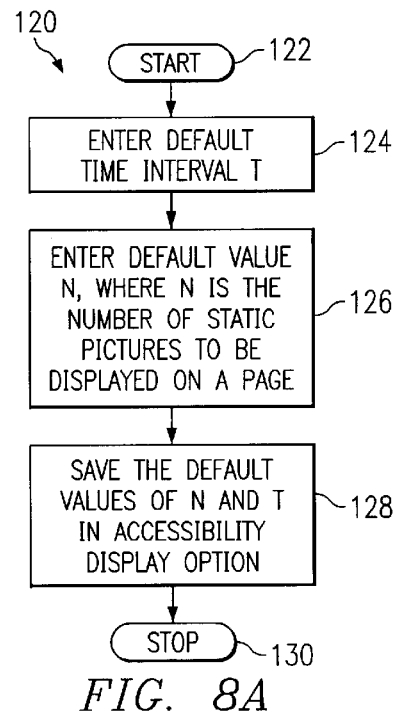
FIG. 8A is a flow chart of the accessibility display process.
Figure 8B:
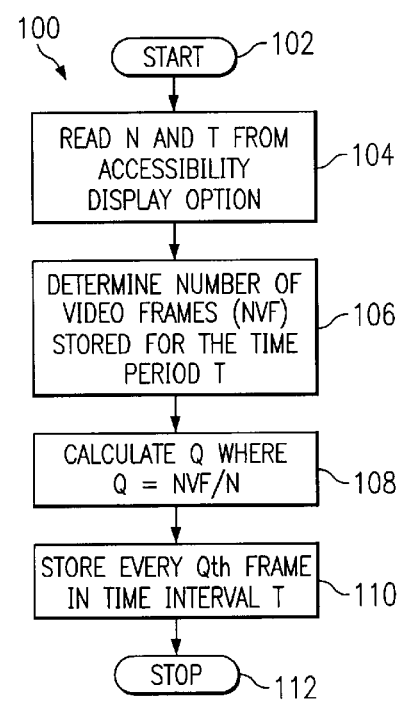
FIG. 8B is a flow chart of the static display process.

FIG. 8A depicts accessibility display option process 120. Accessibility display option process 120 allows a user to establish default values for a time interval T and for the number of static pictures to be displayed on a page N. The process begins (122) and the user enters a default value for time interval T (124). Next the user enters a default value N for the number of static pictures that the user desires to have displayed on a single browser web page (126). The user then saves the default values of N and T for the accessibility display option (128). The process stops (130).

FIG. 8B depicts static display control process 100. The process begins (102) and the values for N and T are read from the accessibility display option (104). The process then determines a value NVF which is the number of video frames stored for the time period T (106). The process then determines a value Q by dividing the value for NVF by N (108). The process will then store every Qth frame from the total frames in Time Interval T in a static data file (110). The process will end (112).

The static image data may flow directly into the display device without being stored in a memory or buffer. For example, if a micro-controller can process the dynamic image data into static image data without using the memory or buffer, the display device can read the static image data directly out of the micro-processor. Internal memory, such as registers included within the micro-controller, may be required for processing purposes. A GUI may not be needed if the display device can accommodate the static image data.

FIG. 9 depicts direct static display control process 140. The process begins (142) and the values for N and T are read from the accessibility display option (144). The process then determines a value NVF which is the number of video frames stored for the time period T (146). The process then determines a value Q by dividing the value for NVF by N (148). The process will then display every Qth frame from the total frames in Time Interval T (150). The process will then determine whether the user desires to see a static display from another interval referred to as Next Time Interval (NT) (152). If the user desires to see a Next Time Interval, then the process sets T to NT (154) and goes to step 146. If the user does not desire to see a Next Time Interval, then the process ends (156).

Referring to FIG. 10, screen 170 of a display device such as a web browser is shown. Prior art dynamic image 160 is a time varying image that displays the image at 30 frames a second on screen 170. Upon suitable user selection, be it menu driven or otherwise, prior art dynamic image 160 is displayed as a set of static frames. Video images are captured in frames and arranged on a side by side layout. Frame 1 (172) is placed in the upper left portion of screen 170. Frame 11 (174) is placed in the upper right portion of screen 170. Frame 21 (176) is placed in the left center of screen 170. Frame 31 (178) is placed in the right center of screen 170. Frame 41 (180) is placed in the lower left portion of screen 170. Frame 51 (182) is placed in the lower right portion of screen 170. As can be appreciated, the above described operation may involve saving or storing a large amount of data. For example, vector graphics images that are changing necessarily require a large amount of storage. However, an image file can be provided and appropriate modifications can be made in regard to timing interval. A script file can be created for side by side display. A sample embodiment with an appropriate vector graphics language such as Super Video Graphics Array (SVGA), a video standard established by the Video Electronics Standards Association (VESA) to provide high-resolution color display on IBM-compatible computers, or PostScript, a page-description language from Adobe Systems that offers high quality graphics.

The present invention can be embodied in the form of computer-implemented processes and apparatus for practicing those processes. The present invention can also be embodied in the form of computer program code containing instructions embodied in tangible media, such as floppy diskettes, CD-ROMs, EPROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

As can be appreciated, the present invention teaches a method for automatically displaying dynamic images as a sequence of still frames. The method includes receiving dynamic image data, transforming the dynamic image data into static image data, storing the static image data, on a frame by frame basis, in a storage device, receiving an input command that calls up the static image data, and displaying, frame by frame, the static image data on at least part of a display device.

Further, the present invention teaches a system for automatically displaying dynamic images as a sequence of still frames. The system includes incoming dynamic image data, a display information card having at least a port for receiving the dynamic image data and an internal memory for storing a set of frames from the dynamic image data, an output of the display information card, and a display device with a screen.

It will be understood that a person skilled in the art may make modifications to the preferred embodiment shown herein within the scope and intent of the claims. While the present invention has been described as carried out in a specific embodiment thereof, it is not intended to be limited thereby but intended to cover the invention broadly within the scope and spirit of the claims.

What is claimed:

1. A method for automatically displaying dynamic imagery as a sequence of still frames comprising:
receiving a plurality of dynamic image data;
transforming said dynamic image data into a plurality of static image data;
simultaneously displaying said plurality of static image data on a display devices;
wherein a number of static image data to be displayed is user-configurable; and
wherein said number of static image data to be displayed remains constant regardless of the size of the dynamic image data.

2. The method of claim 1 further comprising:
receiving a request from a user for displaying said dynamic imagery as a sequence of still frames.

3. The method of claim 1 further comprising: providing an indication of said static image data on a graphical user interface.

4. The method of claim 1 wherein displaying said plurality of images on said display device further comprises placing multiple frames of said static image data in a predetermined configuration upon said display device.

5. The method of claim 1 wherein said step of transforming said dynamic image data into said plurality of static image data further comprises:
determining values for N, T, NVF and Q;
creating a file for every Qth frame of said dynamic image data;
wherein N is the number of static image data to be displayed;
wherein T is a time interval for said dynamic image data;
wherein NVF is a number of frames in the dynamic image data for time interval T; and
wherein Q is the number of frames in the dynamic image data for the time interval T divided by the number of static image to be displayed.

6. The method of claim 1 further comprising providing an accessibility display option, wherein the accessibility display option allows a user to establish a default value for a time interval, and for a number of static pictures to be displayed on a page.

7. A storage medium encoded with machine-readable computer program code for automatically displaying dynamic images as a sequence of still frames, said storage medium including instructions for causing a computer to implement a method comprising:
receiving a dynamic image data;
transforming said dynamic image data into a plurality of static image data;
simultaneously displaying said static image data on a display device;
wherein a number of static image data to be displayed is user-configurable; and
wherein the number of static image data to be displayed remains constant regardless of the size of the dynamic image data.

8. The storage medium of claim 7 further comprising instructions far causing a computer to link a graphical user interface whereby said graphical user interface provides an indication of said static image data.

9. The storage medium of claim 7 further comprising instructions for:
determining values for N, T, NVF and Q;
displaying every Qth frames;
wherein N is the number of static image data to be displayed;
wherein T is a time interval for the dynamic image data;
wherein NVF is a number of frames in the dynamic image data for time interval T; and
wherein Q is the number of frames in the dynamic image data for the time interval T divided by the number of static image to be displayed.

10. The storage medium of claim 7 further comprising instructions for placing multiple frames of said static image in a predetermined configuration upon said display device.

11. The storage medium of claim 7 further comprising instructions for providing are accessibility display option, wherein the accessibility display option allows a user to establish a default values for a time interval, and for a number of static pictures to be displayed on a page.

12. A system for automatically displaying dynamic imagery as a sequence of still frames comprising:
means for receiving said dynamic image data;
means for transforming said dynamic image data into static image data;
means for storing said static image data;
means for simultaneously displaying said static image data;
wherein a number of static image data to be displayed is user-configurable; and
wherein said number of static image data to be displayed remains constant regardless of the size of the dynamic image data.

13. The system of claim 12 further comprising means fur linking a graphical user interface with said system.

14. The system of claim 12 wherein said network is the Internet.

15. The system of claim 12 wherein said means for displaying said static image data is web browser.

16. A programmable apparatus for simultaneously displaying a sequence of still frames from dynamic image data received fl□OM a network comprising;

a computer connected to said network;

a static display program installed on said computer;

a display device connected to said computer;

wherein, said computer is directed by said static display program to transform said dynamic image data into static image data;

wherein a number of static image data to be displayed is user-configurable; and wherein said number of static image data to be displayed remains constant regardless of the size of the dynamic image data.

17. The programmable apparatus of claim 16 wherein said computer is directed by said static display control program to determine values for N, T, NVF and Q and to display every Qth frame of said static image data;

wherein N is the number of static image data to be displayed;

wherein T is a time interval for the dynamic image data;

wherein NVF is a number of frames in the dynamic image data for time interval T; and wherein Q is the number of frames in the dynamic image data for the time interval T divided by the number of static image to be displayed.

18. The programmable apparatus of claim 16 further comprising a display information card installed in said computer having a part for receiving said dynamic image data.

19. The programmable apparatus of claim 16 further comprising a processor for transforming said dynamic image data into static image data.

20. The programmable apparatus of claim 16 further comprising an internal memory for storing said static image data.

21. The programmable apparatus of claim 16 further comprising an external memory coupled to said display.

22. The programmable apparatus of claim 16 further comprising an information card for storing said static image data.

23. The programmable apparatus of claim 16 further comprising a web browser installed on said computer.

24. The programmable apparatus of claim 16 further comprising a graphical user interface linked with said display device.

* * * * *

UNITED STATES PATENT AND TRADEMARK OFFICE
CERTIFICATE OF CORRECTION

PATENT NO. : 6,791,548 B2
DATED : October 1, 2004
INVENTOR(S) : Dutta et al.

It is certified that error appears in the above-identified patent and that said Letters Patent is hereby corrected as shown below:

Column 2,
Line 44, "tile" should be -- file --.

Column 3,
Lines 30 and 44, "is" should be -- 18 --.

Column 9,
Line 35, "devices" should be -- device --.
Line 48, "of images" should be -- of static images --.

Column 10,
Line 59, "fur" should be -- for --.
Line 64, "is web" should be -- is a web --.
Line 67, "fl☐OM" should be -- from --.

Column 12,
Line 3, "part" should be -- port --.

Signed and Sealed this

Twenty-fifth Day of October, 2005

JON W. DUDAS
*Director of the United States Patent and Trademark Office*